(12) United States Patent
Lee et al.

(10) Patent No.: US 10,448,216 B2
(45) Date of Patent: Oct. 15, 2019

(54) NETWORK BROADCAST METHOD USING UNICAST AND RELAY NODE

(75) Inventors: Tae-Jin Lee, Suwon-si (KR); Chang-Yeong Oh, Suwon-si (KR); Pyeong-Soo Mah, Daejeon-si (KR); Ji Hyoung Ahn, Suwon-si (KR); Woo Suk Cha, Haenam-gun (KR); Jongho Park, Yongin-si (KR); Mingyu Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 189 days.

(21) Appl. No.: 14/119,474

(22) PCT Filed: Nov. 1, 2011

(86) PCT No.: PCT/KR2011/008256
§ 371 (c)(1),
(2), (4) Date: Nov. 22, 2013

(87) PCT Pub. No.: WO2012/161387
PCT Pub. Date: Nov. 29, 2012

(65) Prior Publication Data
US 2014/0146803 A1 May 29, 2014

(30) Foreign Application Priority Data

May 24, 2011 (KR) ........................ 10-2011-0048862

(51) Int. Cl.
*H04W 4/06* (2009.01)
*H04W 74/08* (2009.01)
*H04L 12/18* (2006.01)
(52) U.S. Cl.
CPC ............. *H04W 4/06* (2013.01); *H04L 12/189* (2013.01); *H04W 74/0816* (2013.01)

(58) Field of Classification Search
CPC .... H04W 4/06; H04W 74/0816; H04L 12/189
(Continued)

(56) References Cited

U.S. PATENT DOCUMENTS

| 2003/0012176 A1* | 1/2003 | Kondylis | H04W 28/16 370/348 |
| 2003/0033394 A1* | 2/2003 | Stine | H04L 12/5695 709/222 |

(Continued)

FOREIGN PATENT DOCUMENTS

| KR | 10-2007-0083027 | 8/2007 |
| KR | 10-2010-0069952 | 6/2010 |

(Continued)

OTHER PUBLICATIONS

Qayyum et al., Multipoint Relaying for Flooding Broadcast Messages in MobileWireless Networks; Jan. 10, 2002; Proceedings of the 35th Annual Hawaii International Conference on System Sciences, whole document.*

(Continued)

*Primary Examiner* — Un C Cho
*Assistant Examiner* — Jose L Perez
(74) *Attorney, Agent, or Firm* — NSIP Law

(57) ABSTRACT

A network broadcast method using a MAC unicast and an MPR node allows a source node to transmit a data packet to at least one MPR node which is located within one-hop distance from the source node and allows the at least one MPR node to transmit the data packet to each next-ranked MPR nodes. At least one normal node, which is not an MPR node while being located within one-hop distance from the source node, receives the data packet of the source node, which is transferred from the source node to an MPR node or transferred between MPR nodes through overhearing. Although the source node and MPR nodes are in a hidden- (Continued)

node relationship, collision is prevented, thereby minimizing data packet loss to improve the transmission reliability, and enabling the data packet of the source node to be reliably broadcasted on a network.

18 Claims, 10 Drawing Sheets

(58) Field of Classification Search
USPC .......................................................... 370/338
See application file for complete search history.

(56) References Cited

U.S. PATENT DOCUMENTS

| | | | | |
|---|---|---|---|---|
| 2003/0179742 | A1* | 9/2003 | Ogier | H04L 1/1614 370/351 |
| 2006/0056421 | A1* | 3/2006 | Zaki | H04L 1/1664 370/400 |
| 2006/0256741 | A1 | 11/2006 | Nozaki | |
| 2007/0002858 | A1* | 1/2007 | Bichot | H04L 12/1836 370/390 |
| 2007/0104199 | A1* | 5/2007 | Taha | H04L 12/1854 370/392 |
| 2007/0133447 | A1* | 6/2007 | Wentink | H04W 74/002 370/310 |
| 2008/0062916 | A1* | 3/2008 | Mosko | H04L 45/18 370/328 |
| 2008/0089268 | A1* | 4/2008 | Kinder | H04L 1/0015 370/315 |
| 2008/0267106 | A1* | 10/2008 | Buddhikot | H04L 45/16 370/312 |
| 2008/0267116 | A1* | 10/2008 | Kang | H04L 45/20 370/328 |
| 2009/0116420 | A1* | 5/2009 | Jeong | H04B 7/2606 370/312 |
| 2009/0122709 | A1* | 5/2009 | Voglewede | H04L 43/00 370/241 |
| 2012/0250547 | A1* | 10/2012 | Fujita | H04W 4/06 370/252 |

FOREIGN PATENT DOCUMENTS

| | | | |
|---|---|---|---|
| KR | 10-2011-0022821 | 3/2011 | |
| WO | WO 2010134896 A1 * | 11/2010 | ............. H04L 12/18 |

OTHER PUBLICATIONS

Lipman et al., Reliable Optimised Flooding in Ad hoc Networks; May 31-Jun. 2, 2004; IEEE 6th CAS Symp. on Emerging Technologies: Mobile and Wireless Comm; whole document.*
Liang et al., A Survey of Multipoint Relay Based Broadcast Schemes in Wireless Ad Hoc Networks; 4th Quarter 2006; IEEE Communications Surveys & Tutorials; whole document.*
Liang et al., A Survey of Multipoint Relay Based Broadcast Schemes in Wireless Ad Hoc Networks; 4th Quarter 2006; IEEE Communications Surveys & Tutorials; whole document (Year: 2006).*
Federal Standard 1037C, Telecommunications: Glossary of Telecommunication Terms, Aug. 7, 1996, entry for "drop" at www.its.bldrdoc.gov/fs-1037/dir-013/_1804.htm, whole document (Year: 1996).*
Qayyum et al., Multipoint Relaying for Flooding Broadcast Messages in MobileWireless Networks; Jan. 10, 2002; Proceedings of the 35th Annual Hawaii International Conference on System Sciences, whole document (Year: 2002).*
Lipman et al., Reliable Optimised Flooding in Ad hoc Networks; May 31-Jun. 2, 2004; IEEE 6th CAS Symp. on Emerging Technologies: Mobile and Wireless Comm; whole document (Year: 2004).*
Unknown, Understanding Wi-Fi Carrier Sense, Mar. 7, 2011, www.revolutionwifi.net/revolutionwifi/2011/03/understanding-wi-fi-carrier-sense.html,whole document (Year: 2011).*
Chiang et al., Source Routing for Overlay Multicast in Wireless Ad hoc and Sensor Networks, 2007, International Conference on Parallel Processing Workshops (ICPPW 2007), whole document (Year: 2007).*
International Search Report dated May 22, 2012 in corresponding International Patent Application No. PCT/KR2011/008256 (3 pages, in Korean).

* cited by examiner

NETWORK BROADCAST METHOD USING UNICAST AND RELAY NODE

CROSS REFERENCE TO RELATED APPLICATIONS

This application is a National Stage Entry of PCT/KR2011/008256 filed Nov. 1, 2011, and claims the benefit under 35 U.S.C. § 119(a) of Korean Patent Application No. 10-2011-0048862 filed on May 24, 2011 in the Korean Intellectual Property Office, the entire disclosure of which is incorporated herein by reference for all purposes.

TECHNICAL FIELD

The present invention relates to a network broadcast method, and more particularly, to a network broadcast method using a media access control (MAC), a unicast, and a multipoint relay (MPR).

BACKGROUND ART

A wireless ad-hoc network is a network which is autonomously formed between nodes, and allows free entrance and exit and a multi-hop communication without communication infrastructure. As such, the wireless ad-hoc network is used in disaster regions where communication infrastructure is not available, or in the armies, and the utilization field is being extended to private fields.

In the wireless ad-hoc network which uses Carrier Sense Multiple Access/Collision Avoidance (CSMA/CA) type MAC protocol, when a network broadcast is performed using the MPR node, there is a need of a technology for preventing collisions which is generated due to hidden nodes caused by omnidirectional attribute of the wireless media, and for improving transmission reliability.

DISCLOSURE

Technical Problem

The present invention provides a network broadcast method which uses an MAC unicast and an MPR node in order to prevent collisions which are generated due to hidden nodes caused by the omnidirectional attribute of the wireless media and to improve transmission reliability when a network broadcast is performed using the MPR node in a wireless ad-hoc network which uses CSMA/CA type MAC protocol.

Technical Solution

In accordance with a first embodiment of the present invention, there is provided a network broadcast method, including transmitting, by a source node, a data packet to one or more MPR nodes within one hop distance from the source node using a MAC unicast scheme, transmitting, by the one or more MPR nodes, a data packet to a next ranking MPR node of each MPR node using a MAC unicast scheme and transmitting, by the one or more MPR nodes, a data packet to a normal node within one hop distance from each MPR node using a MAC unicast scheme when there is no next ranking MPR node of the node within the one hop distance, wherein transmitting a data packet to one or more MPR nodes of the source node and transmitting a data packet to a next ranking MPR node of each MPR node, one or more normal nodes other than the MPR node within one hop distance from the source node receive the data packet of the source node, which is transmitted from the source node to the MPR node, through overhearing.

In accordance with a second embodiment of the present invention, there is provided a network broadcast method, including transmitting, by a source node, a data packet to one or more MPR nodes within one hop distance from the source node using a MAC unicast scheme, transmitting, by the one or more MPR nodes, a data packet to a next ranking MPR node of each MPR node using a MAC unicast scheme and transmitting, by the one or more MPR nodes, a data packet to a normal node within one hop distance from each MPR node using a MAC unicast scheme when there is no next ranking MPR node of the node within the one hop distance, wherein transmitting a data packet to a next ranking MPR node of each MPR node, one or more normal nodes other than the MPR node within one hop distance from the MPR nodes receive the data packet of the source node, which is transmitted between the MPR nodes, through overhearing.

In accordance with a third embodiment of the present invention, there is provided a network broadcast method including, transmitting, by a source node, a data packet to a first MPR node of the source node, transmitting, by the first MPR node of the source node, the data packet of source node to the first next ranking MPR node of the MPR node, and transmitting, by the first next ranking MPR node which has first received the data packet of the source node, the data packet of the source node to a normal node, wherein the source node and the MPR nodes obtain a channel which transmits the data packet by exchanging an RTS-CTS packet before transmitting the data packet of the source node.

Advantageous Effects

A network broadcast method using an MAC unicast and an MPR node according to one or more embodiments of the present invention may minimize a data loss due to a hidden node at the time of a network broadcast in a wireless ad-hoc network which uses a carrier sense multiple access/collision avoidance (CSMA/CA) type MAC protocol. In detail, the network broadcast method using the MAC unicast and the MPR node according to one or more embodiments of the present invention may improve transmission reliability by minimizing a data packet loss and by preventing a collision even if the source node and the MPR nodes are in a hidden node relation, and provides a reliable network broadcast for the data packet of the source node.

BEST MODE

The description below is merely embodiments for structural or functional explanation, and thus it should not be understood that the scope of rights of the disclosed technology is limited by the embodiments described below. That is, the embodiments may be modified in various ways and may have various forms, and thus it should be understood that the scope of rights of the disclosed technology includes the equivalents which may fulfill the technical concept of the present invention.

The wireless ad-hoc network does not have reliability on the communication infrastructure, and thus the MAC protocol for fair use of wireless resources between nodes without a collision, and a routing protocol for setting the path play an important role.

One of the most important issues in the CSMA/CA type MAC protocol is a hidden node issue, and it occurs due to omnidirectional attributes of the wireless channel.

Figure 1:
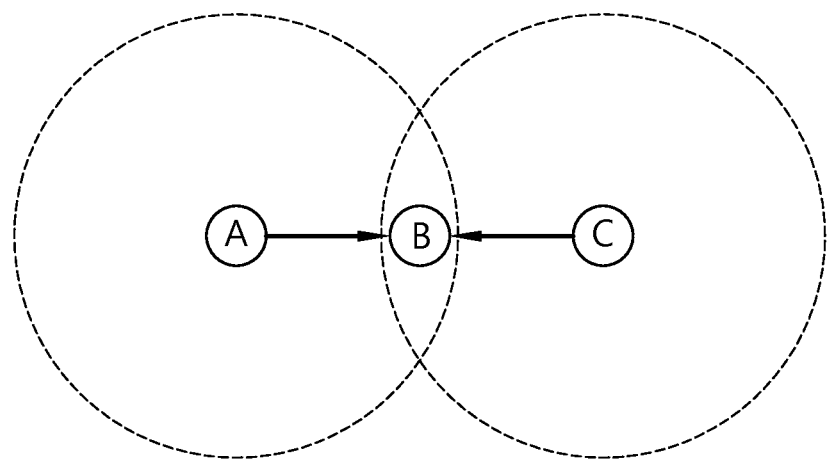
FIG. 1 shows a hidden node relation between node A and node C.

FIG. 1 shows an example showing a hidden node problem. In FIG. 1, node A and node B, and node C and node B are placed within the transmission area of each other, but node A and node C are placed outside the transmission area of each other, and thus are in a hidden node relation.

When node A and node C simultaneously tries to transmit a data frame to node B, the data frame received in node B is discarded due to a collision. In order to prevent such a situation, a method of preventing a channel access of hidden nodes by exchanging Request-To-Send (RTS) and Clear-To-Send (CTS) frames which are control message for a channel reservation before exchanging data frames between the sender node and the reception node, is used.

Furthermore, after the data frame transmission is completed, whether to normally receive the data frame is notified to the sender node through the acknowledgement (ACK) frame, thereby allowing retransmission at the time of an abnormal reception and improving data transmission reliability.

One of the important issues in the routing protocol is a network broadcast. In the routing protocol, a network broadcast is used to transmit information of neighboring node or route-request packet. The network broadcast is a packet transmission type from one source node for all nodes in a network.

One of the simplest methods to implement a network broadcast is a flooding. The flooding is a method of retransmitting a packet if the packet has not been received before and the destination address in the packet is the broadcast address. Implementation of the flooding is easy and there is no need for an information exchange with neighboring nodes, but all nodes in the network should participate in retransmitting one broadcast packet, and thus the efficiency is low.

Optimized Link State Routing (OLSR), which is used in the wireless ad-hoc network, is a proactive routing protocol, and an MPR node has been introduced to reduce the overhead when broadcasting a topology control (TC) packet which is needed in generating a routing table than in the flooding method. Among one hop neighboring nodes, a node, which may transmit a packet to the greatest number of two hop neighboring nodes, is selected as MPR. Hence, the OLSR may broadcast to all nodes which form a network with a less number of transmission than the flooding.

When a network broadcast is performed using the MPR node in the wireless ad-hoc network where the CSMA/CA MAC protocol is used, a hidden node problem may occur. Such a hidden node problem may be divided into two types. The first type is a collision between the source node and the MPR node, and the second type is a collision between the two MPR nodes.

Figure 2:
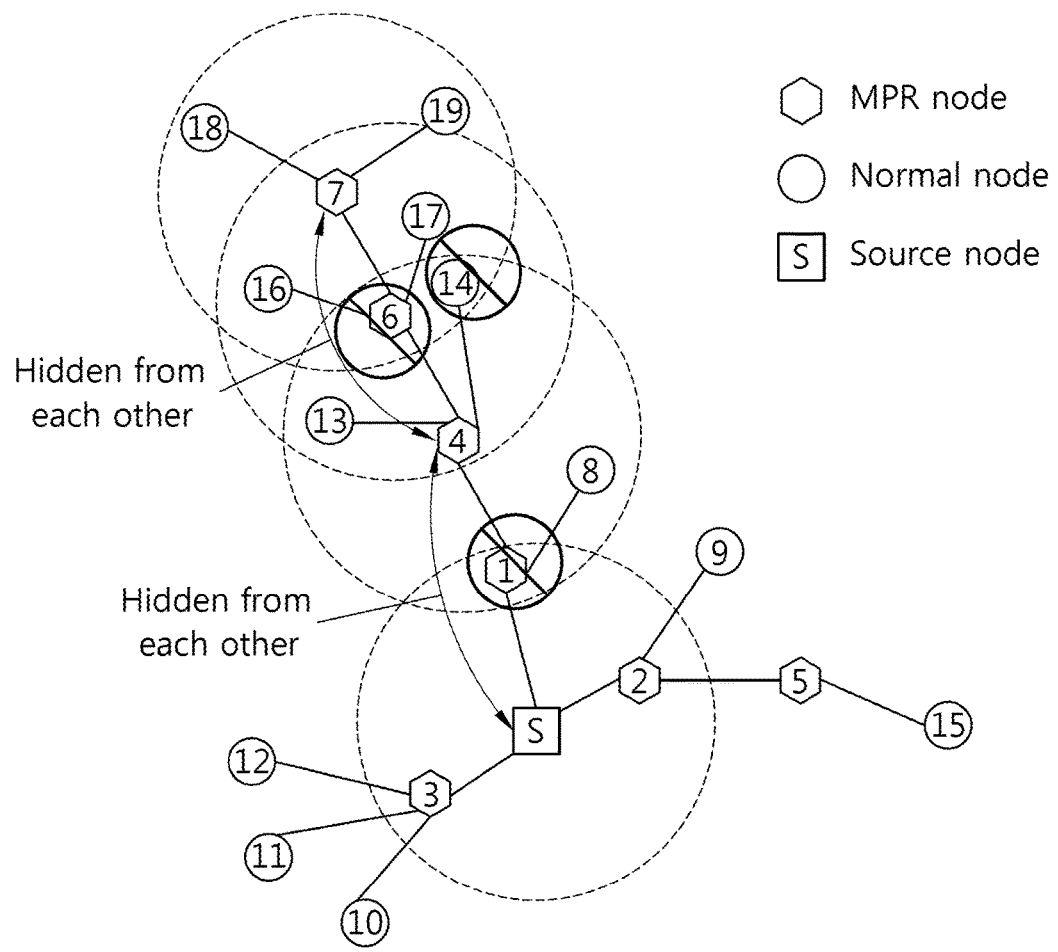
FIG. 2 shows a hidden node problem in a wireless ad-hoc network at the time of a network broadcast using a conventional MAC broadcast method.

FIG. 2 shows a hidden node problem in a wireless ad-hoc network at the time of a network broadcast using a conventional MAC broadcast method. The source node S represents a node which starts a network broadcast, and nodes 1, 2, 3, 4, 5, 6, and 7 represent an MPR node which participates in the network broadcast packet transmission of the source node. Nodes 8, 9, 10, 11, 12, 13, 14, 15, 16, 17, 18, and 19 represent normal nodes.

Here, node S and node 4 are in a hidden node relation, and thus a collision occurs in node 1. Since node 4 and node 7 are also in a hidden node relation, a collision occurs in node 6 and node 14. In the two respective collision cases, more details are described in FIGS. 3 and 4 and FIGS. 5 and 6.

Figure 3:
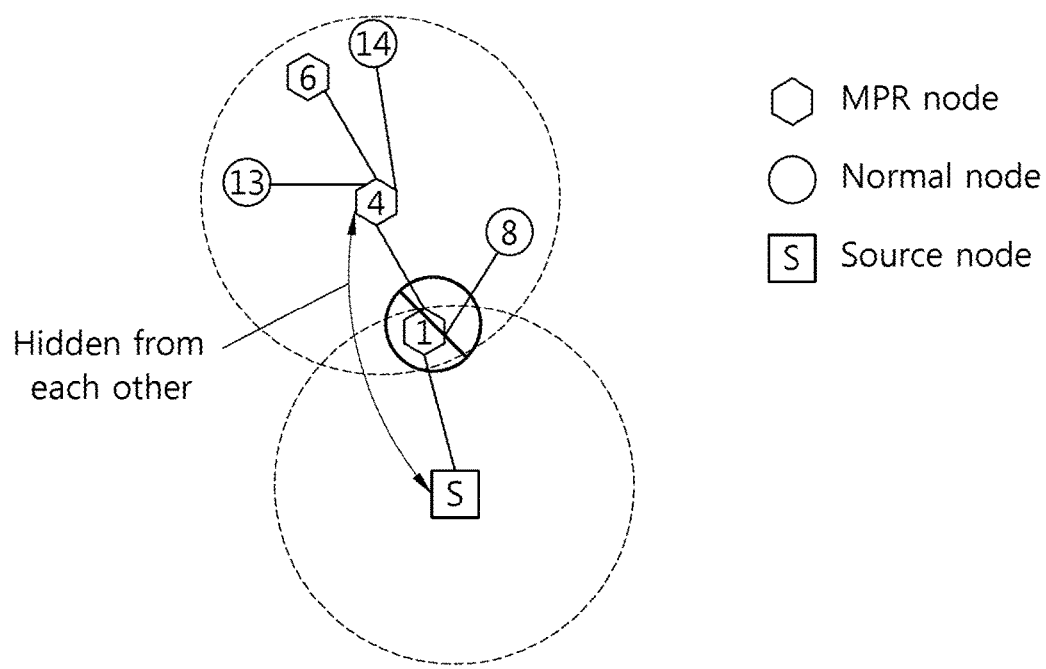
FIG. 3 shows a collision situation between source node and the MPR node which are in a hidden node relation in FIG. 2.

In order to describe in detail a collision situation which occurs due to the source node and the MPR node which do not know the existence of each other in FIG. 2, the associated nodes have been enlarged and shown in FIG. 3.

In FIG. 3, node 4 may retransmit the first data packet which has been received from node 1. Node S may complete transmission of the first data packet and transmit the second data packet. At this time, node 1, which is located in a position where node 4 overlaps with the transmission area of the source node S, is positioned between node 4, which transmits the first packet, and the source node S, which transmits the second packet S, thereby generate a packet loss due to the MAC layer collision.

Figure 4:
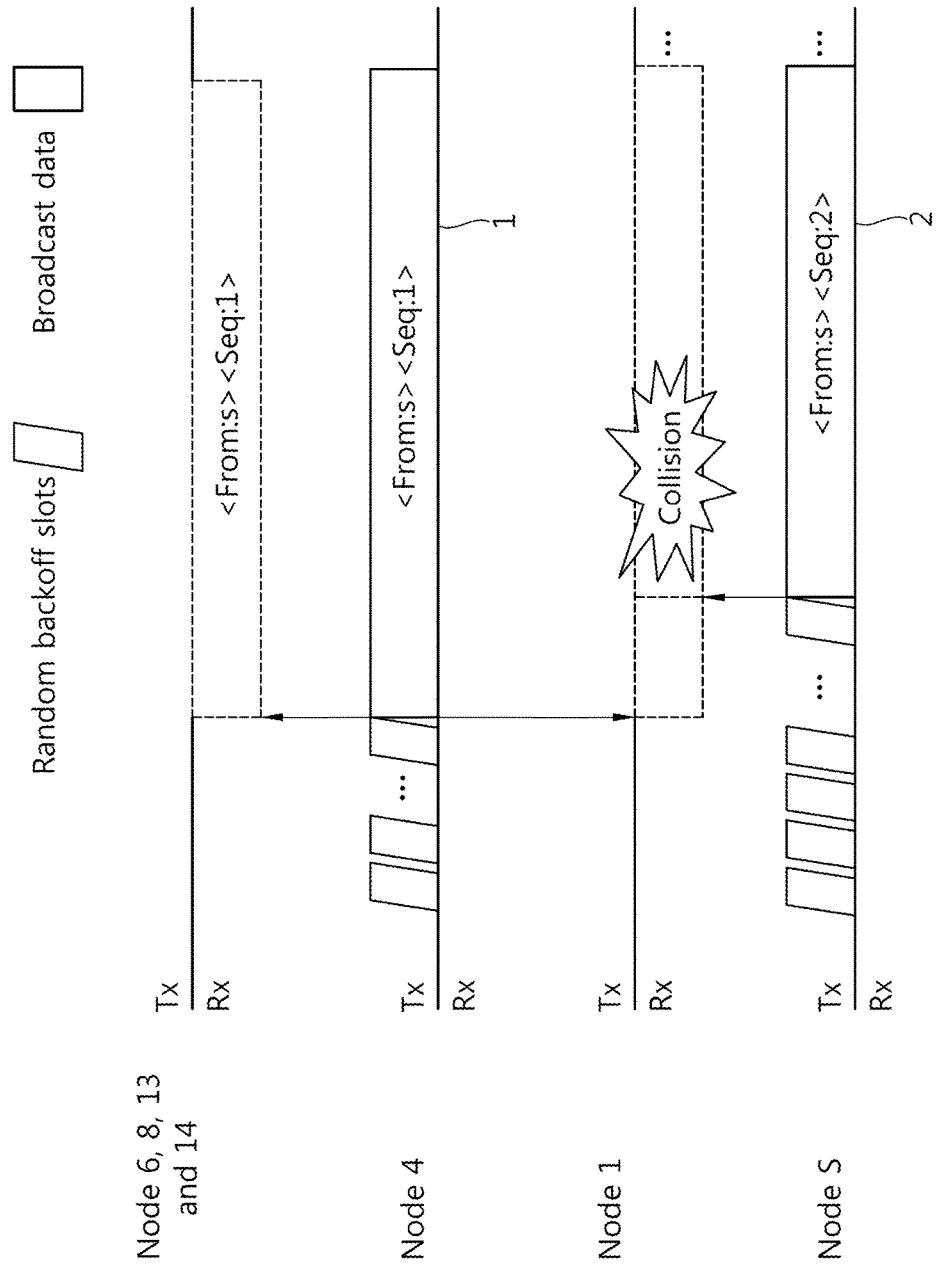
FIG. 4 shows a process of transmitting a data packet of the source node and the MPR node which are in a hidden node relation in FIG. 3 on a time axis.

FIG. 4 shows a process of transmitting a data packet of the source node and the MPR node which are in a hidden node relation in FIG. 3 on a time axis. The quadrangle, which is displayed on the upper side on the basis of the horizontal line, refers to a data packet which comes out of the node, and the lower side refers to a data packet which comes into the node.

A parallelogram represents a random backoff slot, and a rectangle represents data packets 1 and 2 which are sent from node 4 and the source node S. "From" and "Seq", which are indicated in the rectangle indicating the data packet, represent network broadcast packet header information in the MAC protocol data unit (MPDU), and respectively refer to the source node address and the sequence number of the packet. Here, the sequence number is a integer which remembers the sequence number, which has been sent lastly for each node, is increased by 1 for each packet transmission, and is then attached to the packet header and is sent. The sequence number is used in examining whether to redundantly receive the packet at the time of the network broadcast and reassemble the packets, which have arrived without order, in order.

If the source node transmits the first packet 1, node 1, which receives the first packet 1, retransmits the data packet 1, as the MPR node of the source node. In FIG. 4, node 4, which receives the packet 1, retransmits the packet 1, and at this time, the source node S transmits the second packet 2. The first packet 1, which is retransmitted at the node 4, unexpectedly reaches node 1, and the second packet 2, which is transmitted from the source node S, reaches node 1 as intended. The two packets 1 and 2 collide in node 1.

Figure 5:
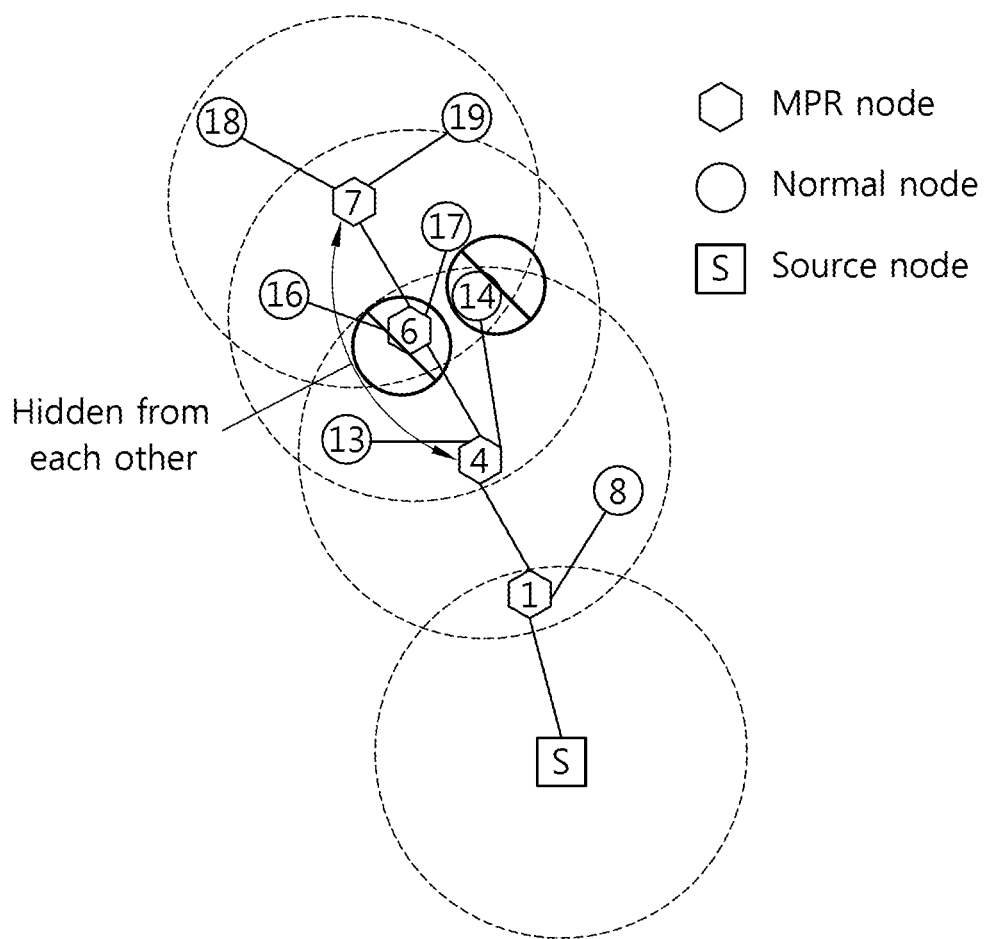
FIG. 5 shows a collision situation which occurs between two MPR nodes which are in a hidden node relation in FIG. 2.

In order to explain the collision situation in FIG. 2 with more detail, which occurs due to the two MPR nodes are hidden from each other, only the related nodes have been enlarged and shown in FIG. 5.

In FIG. 5, node 6 and node 14, which are in the area where the transmission range of node 4 overlaps with the transmission range of node 7, are in a position where data may be transmitted from both node 4 and node 7. However, node 4 and node 7 are located beyond the transmission range of each other, and thus are in a hidden node relation.

If the time point of the data transmission of node 4 coincides with the time point of the data transmission of node 7, or anyone of above nodes transmits data during data transmission of the other, node 6 and node 14 may not receive data due to a collision.

Figure 6:
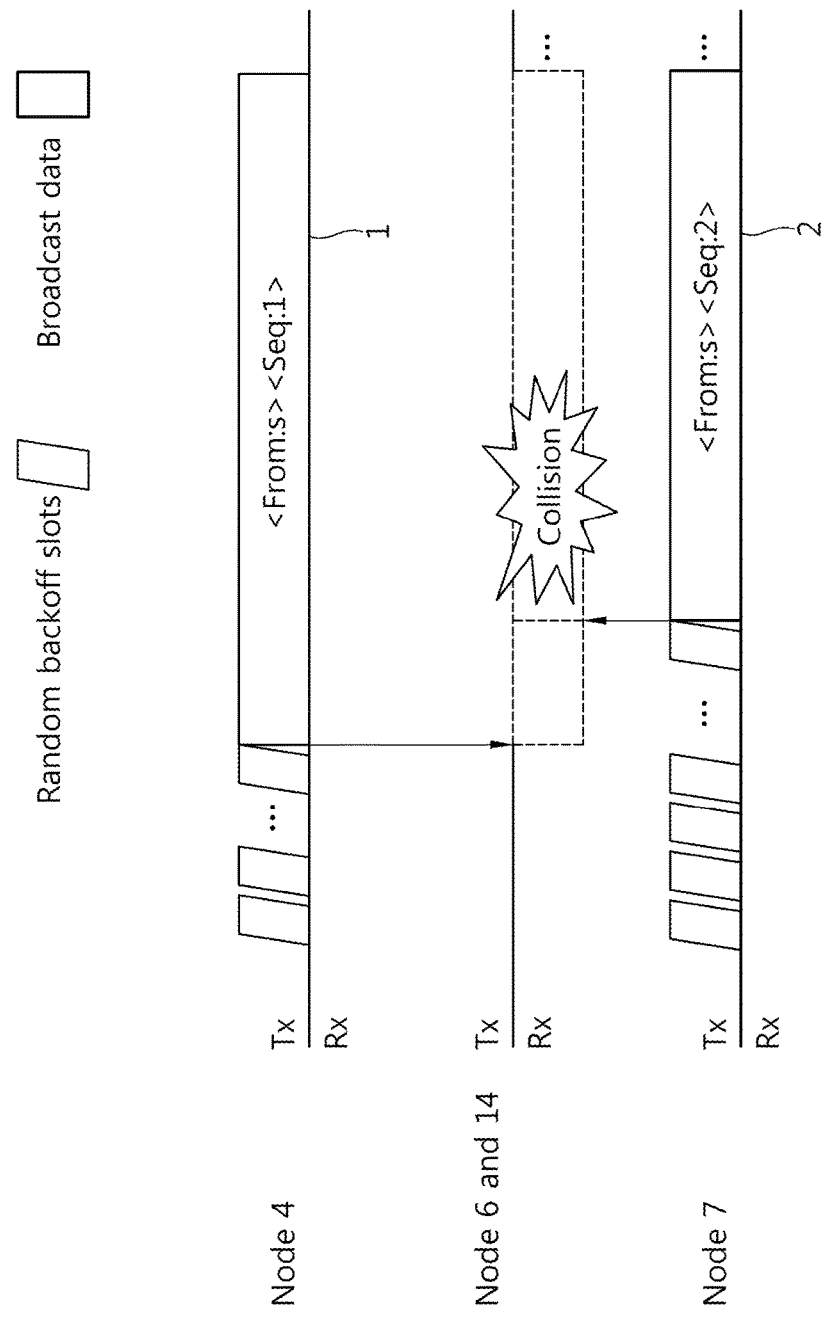
FIG. 6 shows a process of transmitting a data packet of two MPR nodes which are in a hidden node relation in FIG. 5 on a time axis.

In FIG. 6, a collision situation is expressed on a time axis from the perspective of the MAC layer based on FIG. 5. The quadrangle, which is displayed on the upper side on the basis of the horizontal line, refers to the data packet which goes out of the node, and the lower side refers to the data packet, which comes into the node.

A horizontally tilted parallelogram represents a random backoff slot, and a rectangle refers to data packets 1 and 2 which are sent from node 4 and node 7.

"From" and "Seq", which are displayed within the rectangle indicating the MAC frame, represent the information of the network broadcast packet header within the MPDU, and respectively refer to the source node address and the sequence number of the data packet.

Here, the sequence number is a integer which remembers the sequence number, which has been sent lastly for each node, is increased by 1 for each packet transmission, and is then attached to the packet header and is sent. The sequence number is used in examining whether to redundantly receive the packet at the time of the network broadcast and reassemble the packets, which have arrived without order, in order.

Node 4 and node 7 respectively start the random backoff process to retransmit the network broadcast packets 1 and 2 of node S. When Node 4, in which the backoff section is finished, retransmits the data packet 1 of the source node, the backoff section of the node 7, which fails to sense the retransmission of node 4, is also finished, and node 7 also retransmits the data packet 2 of the source node. Two data packets, which are sent from two respective nodes, collide in node 6 and node 14.

Figure 7:
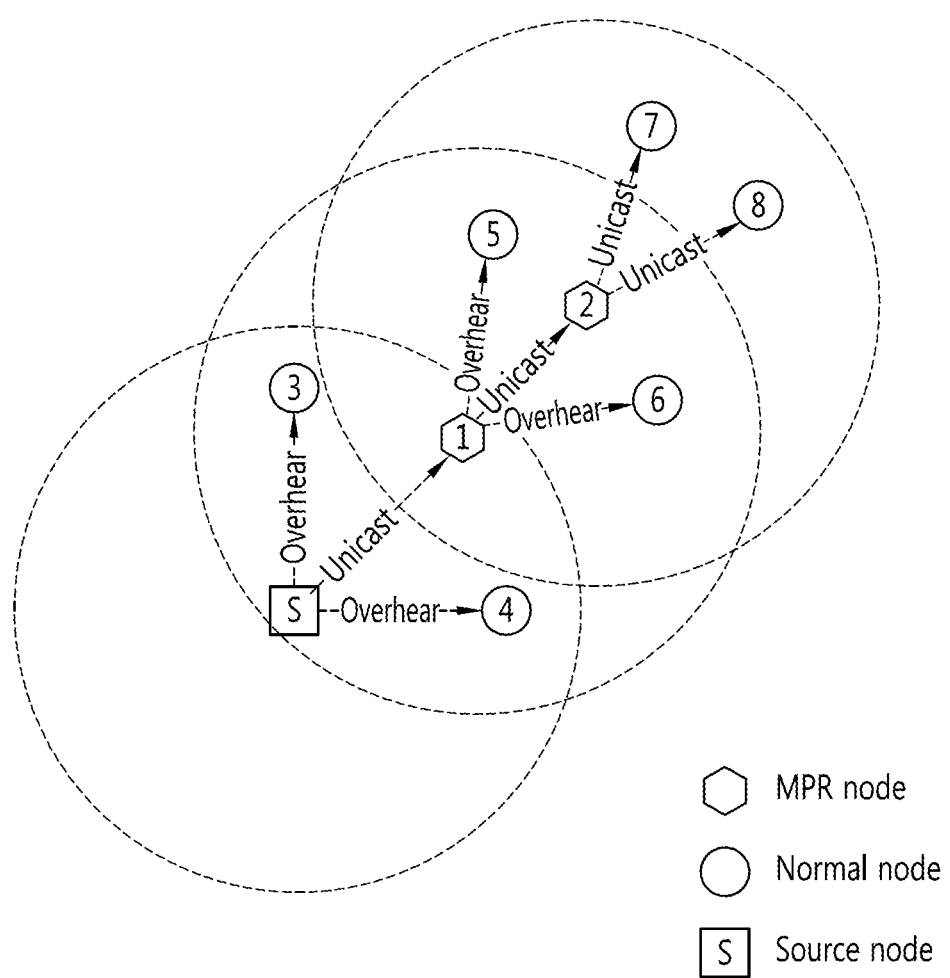
FIG. 7 shows a process of transmitting a data packet of the source node on the entire network topology, according to an embodiment of the present invention.

FIG. 7 shows a process of transmitting a data packet of the source node on the entire network topology, according to an embodiment of the present invention. Node S represents a source node which starts the broadcast, and MPR nodes 1 and 2 represent the relay nodes which participate in the network broadcast packet transmission of the source node S, and the normal nodes 3, 4, 5, 6, 7, and 8 represent the normal nodes which do not participate in the network broadcast packet transmission. The number or English alphabet within the circle is an identifier for identifying the node.

a) First, in the embodiment of the present invention, the source node S transmits the data packet to node 1 which is its own MPR node among nodes within 1 hop distance, using the MAC unicast.

a-1) Node 3 and node 4, which are within one hop distance from the source node and are not the MPR node, are normal nodes, and receive the data packet of the source node S, which is transmitted to node 1 which is the MPR node of source node, through overhearing.

b) Node 1, which receives the packet of the source node S, transmits the data packet of the source node S to node 2 which is the MPR node of node 1 with the purpose of the network broadcast.

b-1) nodes 5 and 6, which are normal nodes, also receive the data packet of the source node through overhearing when node 1, which is the MPR node of the source node S, transmits the data packet to node 2 which is the MPR node of node 1 in the same manner used when nodes 3 and 4 receive the data packet of the source node S.

c) node 2 may also transmit the data packet to the MPR node within one hop radius of node 2 as in node 1, but in the present embodiment, the MPR node does not exist. Hence, node 2, which is the MPR node, transmits the data packet of the source node S to respective nodes 7 and 8 which are normal nodes within one hop radius of node 2, using the MAC unicast method.

Figure 8:
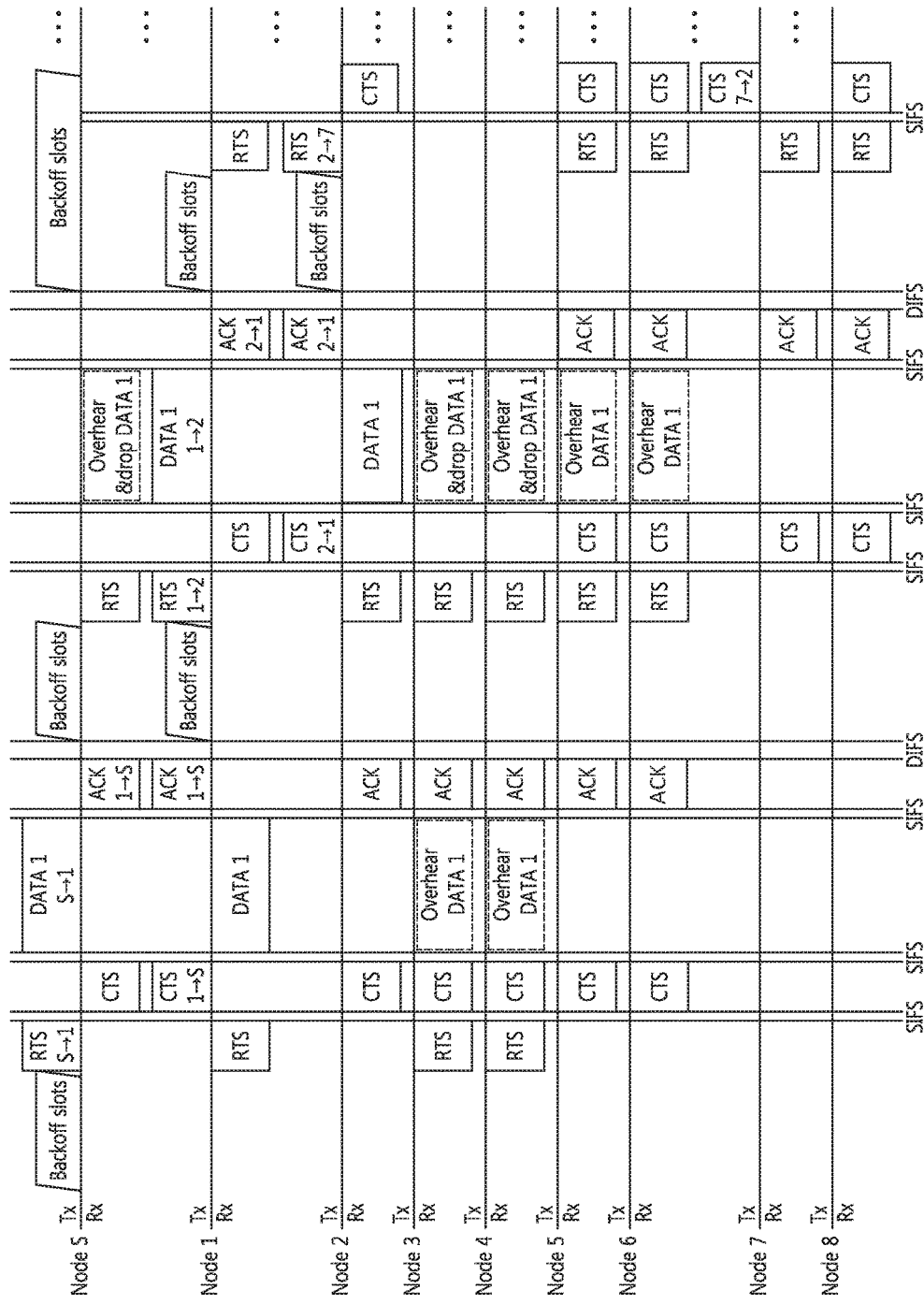
FIG. 8 shows a process where a data packet of the source node is network-broadcast to the entire network topology on a time axis, according to an embodiment of the present invention.

FIG. 8 shows a process where a data packet of the source node S is network-broadcast to the entire network topology on a time axis, according to an embodiment of the present invention. The quadrangle, which is displayed on the upper side on the basis of the horizontal line, refers to a packet which is transmitted from the node, and the lower side refers to a packet which is received to the node.

The parallelogram represents a random backoff slot, and the RTS, CTS, and DATA within the rectangle represent types of data packets and are transmitted in an arrow direction. Furthermore, the rectangle represents the data packet which is received through a MAC unicast method, and the rectangle, which is shown by dotted lines, represents the data packet which is received through overhearing. In the rectangle, which is displayed in dotted lines, "Overhear" refers to overhearing, and "drop" refers to deleting the data packet which has been received by overhearing if the packet has been redundantly received.

FIG. 8 illustrates transmitting the data packet of the source node by obtaining the channel in the order of the source node S, node 1, and node 2. The data packet of the source node is network-broadcast through the MAC unicast method using the MPR node, which has been described above when describing the transmission process with reference to FIG. 7.

Figure 9:
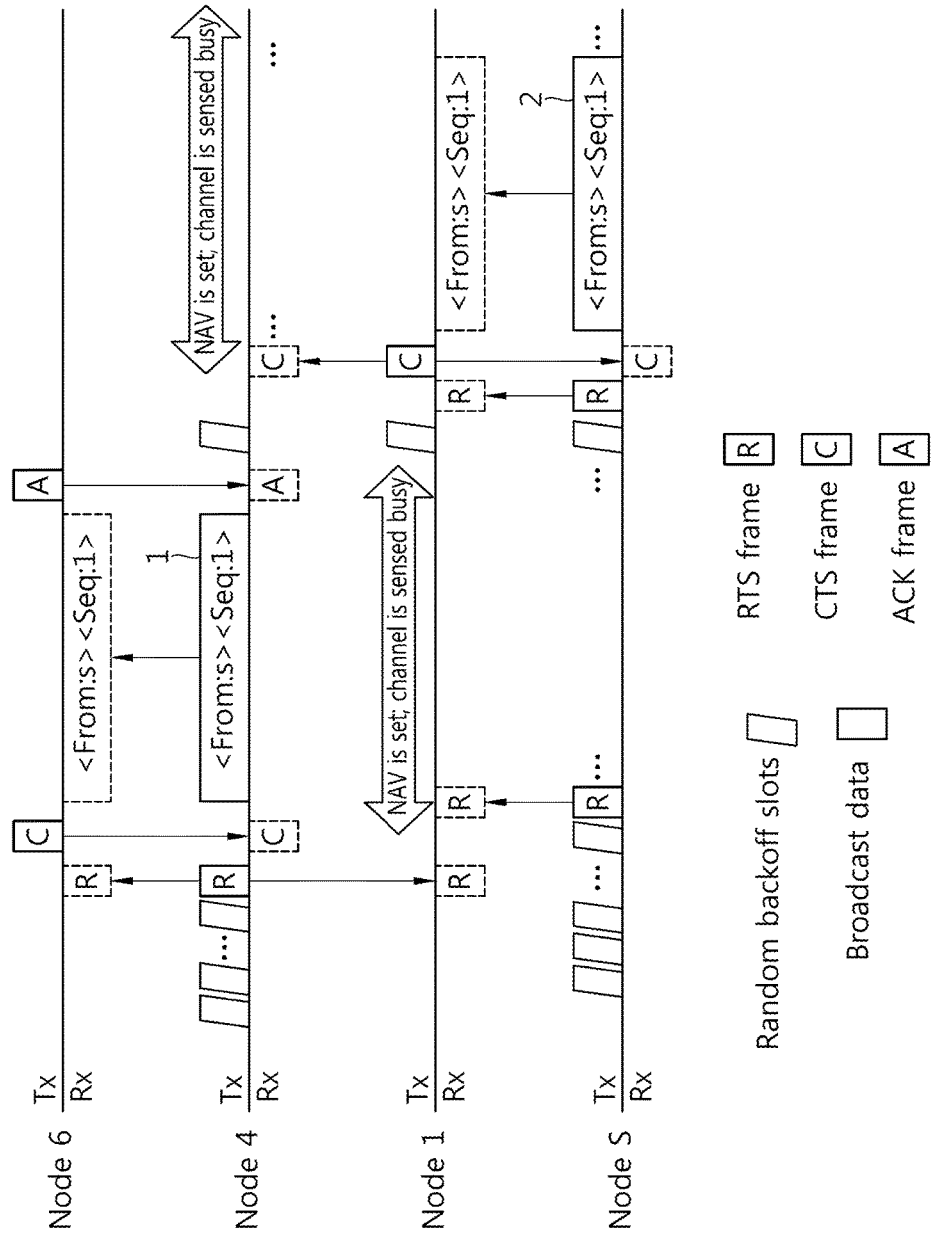
FIG. 9 shows a process of transmitting a data packet of the source node and the MPR node which are in a hidden node relation on a time axis, according to an embodiment of the present invention.

FIG. 9 shows a process of transmitting a data packet when the source node S and node 4 are in a hidden node relation as in FIG. 3, on a time axis, according to an embodiment of the present invention.

In FIG. 3, the source node S may transmit the first data packet of source node S to node 1 which is the MPR node. Node 1 may transmit the first data packet of the source node to node 4 which is the MPR node of node 1.

Thereafter, when node 4 tries to transmit the first data of the source node to node 6, the source node may try to transmit the second data packet of the source node to node 1.

In FIG. 9, according to an embodiment of the present invention, node 4 obtains a channel which is to transmit the first data packet 1 of the source node through the RTS-CTS packet exchange before transmitting the first data packet 1 of the source node to node 6.

In this process, node 1 receives the RTS packet of node 4, which is transmitted to node 6, through overhearing.

Hence, node 1 sets the Network Allocation Vector (NAV) through the RTS packet which is received through node 4 until node 4 transmits the first data packet 1 of the source node to node 6, and thereafter performs NAV setting through the first data packet 1 in the process where the first data packet 1 is transmitted.

Node 1 avoids a collision which generates the loss of the first data packet 1 through the above method.

Furthermore, after node 1 completes the transmission of the first data packet 1 of the source node S in FIG. 9, the source node may transmit the second data packet 2 to node 1. Node 4 performs NAV setting by receiving CTS packet from node 1 through the overhearing method when node 1 and the source node exchange the RTS-CTS packet. Nodes 8, 13, and 14 receive the data packet through overhearing without participating in the transmission in the present embodiment.

Figure 10:
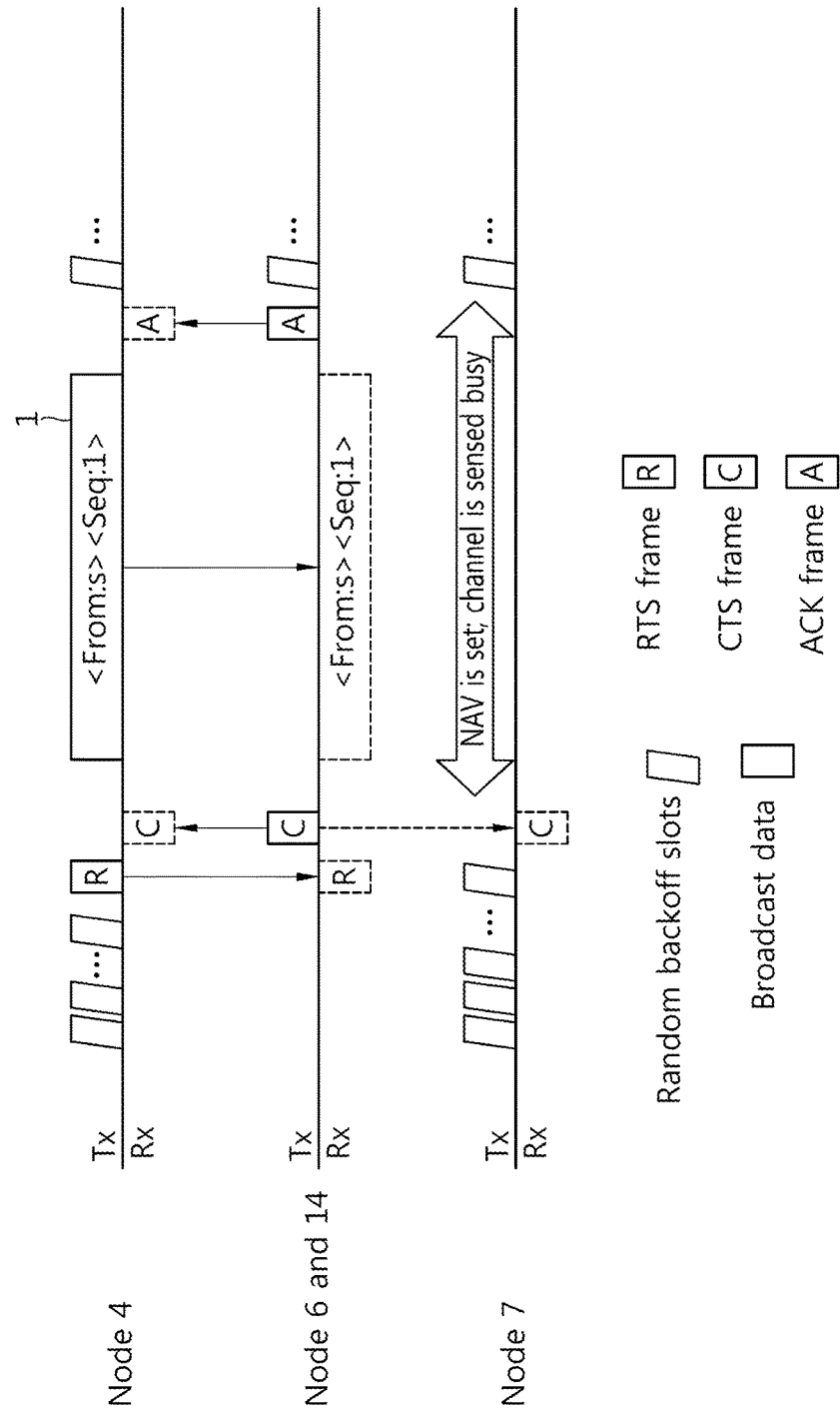
FIG. 10 shows a process of transmitting a data packet of two MPR nodes which are in a hidden node relation on a time axis, according to an embodiment of the present invention.

FIG. 10 shows a process of transmitting a data packet when node 4 and node 7, which are MPR nodes, are in a hidden node relation, according to an embodiment of the present invention.

In FIG. 5, node 4 and node 7 are MPR nodes, and may transmit the data packet to node 6 with the purpose of the network broadcast. In FIG. 10, according to an embodiment of the present invention, node 4 obtains a channel to transmit the data packet 1 through the RTS-CTS packet exchange before transmitting the broadcast data packet 1 to node 6.

In this process, node 7 receives the CTS packet of node 6, which is transmitted to node 4, through overhearing. In the CSMA/CA method, which has been described above as the prior art, nodes, which do not participate in the data transmission/reception after the RTS-CTS exchange, may avoid a collision through the NAV setting. Hence, when node 4 transmits the network broadcast data packet 1 to node 6, node 7 avoids a collision which generates the loss of the network broadcast data packet 1 by performing NAV setting through the CTS packet which has been received through node 6.

A person having ordinary skill in the art to which the present invention pertains may change and modify the present invention in various ways without departing from the technical spirit of the present invention. Accordingly, the present invention is not limited to the above-described embodiments and the accompanying drawings.

The invention claimed is:

1. A network broadcast method, comprising:
    transmitting, by a source node comprising a processor, using a media access control (MAC) unicast scheme in a communications network, a first data packet to a first multipoint relay (MPR) node of the source node in the network within one hop from the source node, the first MPR node corresponding to a destination node of the first data packet;
    transmitting, by the first MPR node using the MAC unicast scheme, a second data packet to a next second MPR node of the first MPR node in the network within one hop from the first MPR node and outside the one hop from the source node, the next second MPR node corresponding to a destination node of the second data packet;
    setting, by the first MPR node, a Network Allocation Vector (NAV) to prevent a collision due to transmission of a hidden node, in response to receiving a Request to Send (RTS) or Clear to Send (CTS) frame intended for a node other than the first MPR node; and
    transmitting, by the next second MPR node using the MAC unicast scheme, a third data packet to a first receiver node within one hop from the next second MPR node and outside the one hop from the first MPR node, the first receiver node being a non-multipoint relay (non-MPR) node and corresponding to a destination node of the third data packet,
    wherein a second receiver node, corresponding to a non-MPR node different from the first MPR node and within the one hop from the source node, receives the first data packet that is intended for the first MPR node through overhearing and receives the second data packet that is intended for the next second MPR node through overhearing, and the second receiver node drops the second data packet to prevent redundancy with the first data packet, and
    wherein a third receiver node, corresponding to a non-MPR node different from the next second MPR node and within the one hop from the first MPR node, receives the second data packet that is intended for the next second MPR node through overhearing.

2. The network broadcast method of claim 1, wherein the transmitting of the first data packet comprises obtaining a transmission channel by performing a NAV setting through an RTS-CTS packet exchange before transmitting the first data packet in order to avoid a collision at the first MPR node with a transmission from the next second MPR node.

3. A network broadcast method, comprising:
    transmitting, by a source node comprising a processor, using a media access control (MAC) unicast scheme in a communications network, a first data packet to at least one first multipoint relay (MPR) node of the source node in the network within one hop from the source node, the at least one first MPR node corresponding to a respective destination node of the first data packet;
    transmitting, by the at least one first MPR node using the MAC unicast scheme, a second data packet to at least one next second MPR node of the at least one first MPR node within one hop from one of the at least one first MPR node and outside the one hop from the source node, the at least one next second MPR node corresponding to a respective destination node of the second data packet;
    setting, by the at least one first MPR node, a Network Allocation Vector (NAV) to prevent a collision due to transmission of a hidden node, in response to receiving a Request to Send (RTS) or Clear to Send (CTS) frame intended for a node other than the first MPR node; and
    transmitting, by the at least one next second MPR node using the MAC unicast scheme, a third data packet to a first receiver node within one hop from one of the at least one next second MPR node and outside the one hop from the one of the at least one first MPR node, the first receiver node being a non-multipoint relay (non-MPR) node and corresponding to a destination node of the third data packet,
    wherein the first data packet, intended for the at least one first MPR node, and the second data packet, intended for the at least one next second MPR node, are received through overhearing at a second receiver node, corresponding to a non-MPR node different from the at least one first MPR node, within the one hop from the source node, and the second receiver node drops the second data packet to prevent redundancy with the first data packet, and wherein the second data packet, intended for the at least one next second MPR node, is received through overhearing at a third receiver node, corresponding to a non-MPR node different from the at least one next second MPR node, within the one hop from the one of the at least one first MPR node.

4. The network broadcast method of claim 3, wherein the transmitting of the first data packet comprises obtaining a transmission channel by performing a NAV setting through an RTS-CTS packet exchange before transmitting the first data packet in order to avoid a collision at the at least one first MPR node with a transmission from the one of the at least one next second MPR node.

5. A network broadcast method, comprising:
transmitting, by a source node comprising a processor, using a media access control (MAC) unicast scheme in a communications network, a data packet to a first multipoint relay (MPR) node of the source node, a destination address of the MAC unicast scheme being set to the first MPR node;
transmitting, by the first MPR node using the MAC unicast scheme, the data packet of the source node to a next second MPR node of the first MPR node, the destination address of the MAC unicast scheme being set to the next second MPR node;
setting, by the first MPR node, a Network Allocation Vector (NAV) to prevent a collision due to transmission of a hidden node, in response to receiving a Request to Send (RTS) or Clear to Send (CTS) frame intended for a node other than the first MPR node; and
in response to receiving the data packet of the first MPR node, transmitting the data packet from the next second MPR node to a first receiver node using the MAC unicast scheme, the destination address of the MAC unicast scheme being set to the first receiver node corresponding to a non-multipoint relay (non-MPR) node,
wherein a channel is obtained for transmitting the data packet by an RTS-CTS packet exchange before transmitting the data packet,
wherein a second receiver node, corresponding to a non-MPR node different from the first MPR node and within the one hop from the source node, receives the data packet through overhearing when the data packet is sent to the first MPR node and receives the data packet through overhearing when the data packet is sent to the next second MPR node, and the second receiver node drops the data packet that is received when the data packet is sent to the next second MPR node to prevent redundancy with the data packet that is received when the data packet is send to the first MPR node, and
wherein a third receiver node, corresponding to a non-MPR node different from the next second MPR node and within the one hop from the first MPR node, receives the data packet through overhearing when the data packet is sent to the next second MPR node.

6. The network broadcast method of claim 5, wherein the transmitting, by the source node, of the data packet to the first MPR node comprises:
receiving, by the next second MPR node, a CTS packet intended for the source node, which is transmitted from the first MPR node to the source node.

7. The network broadcast method of claim 5, wherein the transmitting, by the first MPR node, the data packet to the next second MPR node comprises:
receiving, by the first MPR node, an RTS packet, which is transmitted to the next second MPR node.

8. The network broadcast method of claim 5, further comprising:
receiving, by the first MPR node, an RTS packet intended for the first receiver node, which is transmitted from the next second MPR node to the first receiver node.

9. The network broadcast method of claim 1, wherein the second data packet and third data packet each comprise data transmitted in the first data packet.

10. A method of a multipoint relay (MPR) node in an ad-hoc wireless network, the method comprising:
relaying a data packet, wherein the relaying of the data packet comprises:
receiving, from a source node comprising a processor, in a communications network, the data packet, wherein the data packet is sent to the MPR node using a media access control (MAC) unicast scheme; and
sending the data packet to a second MPR node, in response to receiving the data packet sent to the MPR node using the MAC unicast scheme;
receiving an overheard data packet, wherein the receiving of the overheard data packet comprises:
receiving a Request to Send (RTS) frame intended for a different third MPR node of the second MPR node, from the second MPR node; and
receiving the overheard data packet from the second MPR node, wherein the overheard data packet is sent to the different third MPR node using the MAC unicast scheme;
performing a Network Allocation Vector (NAV) setting, to prevent a collision due to transmission of a hidden node, in response to receiving an RTS frame intended for a node other than the MPR node; and
performing a NAV setting, to prevent a collision due to transmission of a hidden node, in response to receiving a Clear to Send (CTS) frame intended for a node other than the MPR node,
wherein a first normal node, corresponding to a non-multipoint relay (non-MPR) node different from the MPR node and within one hop from a source node, receives the data packet through overhearing when the data packet is send to the MPR node and receives the data packet through overhearing when the data packet is sent to the second MPR node, and the first normal node drops the data packet that is received when the data packet is sent to the second MPR node to prevent redundancy with the data packet that is received when the data packet is sent to the MPR node, and
wherein a second normal node, corresponding to a non-MPR node different from the second MPR node and within the one hop from the MPR node, receives the data packet intended for the second MPR node through overhearing.

11. The method of claim 10, further comprising:
selecting a node among nodes within one hop of the MPR node as the second MPR node prior to the relaying of the data packet,
wherein the sending of the data packet to the second MPR node further comprises:
sending an RTS frame to the second MPR node;

receiving, from the second MPR node, a CTS frame intended for the MPR node, in response to the RTS frame;

sending the data packet, using the MAC unicast scheme, to the second MPR node;

receiving an acknowledgement (ACK) from the second MPR node, in response to the sending of the data packet.

12. The method of claim 10, wherein each RTS frame and each CTS frame use the MAC unicast scheme.

13. The method of claim 1, wherein the first receiver node is outside the one hop from the source node.

14. The method of claim 1, wherein the second receiver node is outside the one hop from the next second MPR node.

15. The method of claim 1, wherein the third receiver node is outside the one hop from the source node.

16. The method of claim 1, wherein no subsequent MPR node of the next second MPR node exists within the one hop from the next second MPR node and outside the one hop from the first MPR node.

17. The method of claim 3, wherein no subsequent MPR node of the one of the at least one next second MPR node exists within the one hop from the one of the at least one next second MPR node and outside the one hop from the one of the at least one first MPR node.

18. The method of claim 5, wherein no subsequent MPR node of the next second MPR node exists within one hop from the next second MPR node and outside the one hop from the first MPR node.

\* \* \* \* \*